United States Patent [19]

Freeman

[11] Patent Number: 5,755,174

[45] Date of Patent: May 26, 1998

[54] TRAFFIC SAFETY CONTROL SECURITY SYSTEM AND METHOD

[75] Inventor: Donald H. Freeman, Clifton, N.J.

[73] Assignee: Continental Safety Supply Co., Inc., Clifton, N.J.

[21] Appl. No.: 651,808

[22] Filed: May 21, 1996

[51] Int. Cl.[6] .............................. B60Q 7/00; E01F 9/012
[52] U.S. Cl. .................................................. 116/63 C; 70/58
[58] Field of Search ............................... 116/63 C, 63 P; 40/607, 608, 612; 340/908, 908.1, 473; 403/368; 404/10, 12; 70/18, 58

[56] References Cited

U.S. PATENT DOCUMENTS

| | | | |
|---|---|---|---|
| 849,065 | 4/1907 | Guttzeit | 403/368 |
| 1,435,363 | 11/1922 | Wood | 116/63 R |
| 2,648,761 | 8/1953 | Shamel | 340/908.1 |
| 4,712,394 | 12/1987 | Bull | 70/18 |
| 4,729,690 | 3/1988 | Lavender et al. | 404/10 |
| 4,733,840 | 3/1988 | D'Amore | 70/58 X |
| 5,269,251 | 12/1993 | Freeman | 116/63 C |
| 5,279,136 | 1/1994 | Perry | 70/18 |

FOREIGN PATENT DOCUMENTS 2081348  2/1982  United Kingdom ............... 116/63 C

*Primary Examiner*—William A. Cuchlinski, Jr.
*Assistant Examiner*—Willie Morris Worth
*Attorney, Agent, or Firm*—W. Patrick Quast, Esq.

[57] ABSTRACT

A traffic safety control security system is described. Warning lights, signs, and warning flags are connected and secured to the tops of standard traffic cones either with or without the use of cone adapters. One end of a stainless steel aircraft cable connects directly to the traffic control accessories, while the other end of the cable is secured by a removable security disc and padlock within the traffic cone. Interconnecting the accessory and traffic cone together prevents injury to vehicles or individuals nearby if a traffic cone is accidentally struck by a vehicle, or encounters violent weather, causing the accessory to fly loose as a projectile. In addition a chain can now interconnect traffic cones in the system together, preventing theft of the traffic cones and/or accessories. Set up and knock down of the system is consistent with customary traffic safety control procedures.

23 Claims, 8 Drawing Sheets

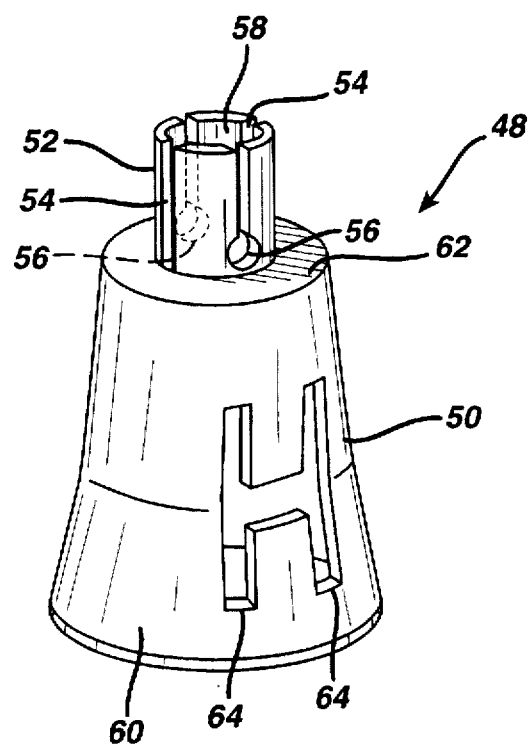

TRAFFIC SAFETY CONTROL SECURITY SYSTEM AND METHOD

BACKGROUND

This invention relates to traffic safety control systems, and in particular to devices and methods for securing such systems.

As is well recognized, traffic control systems, making use of traffic markers such as traffic cones, are routinely used today to direct motorists away from dangerous areas. Traffic cones are usually brightly colored, hollow, light weight markers made of an elastomeric material so as to minimize damage to persons or vehicles which may collide with them. The wide spread use of these relatively standard traffic cones insures their being made available at reasonable cost.

In addition to delineating area of concern to motorists, traffic markers, including traffic cones, are routinely employed to support warning lights, information signs, and warning flags as further traffic aids. Ropes, chains, and barricade tapes are also affixed to these traffic cones to perimeterize a given area of concern.

For example, in U.S. Pat. No. 5,269,251 devices and methods are disclosed for utilizing standard traffic cones to support standard information signs, standard flags and staffs, standard barricade rope and standard barricade tape, standard chemical light sticks, and battery operated warning lamps. A unique polyvinylchloride adapter (28-FIG. 3) is described, having one end that fits over the top of a typical traffic cone, with the other end of the adapter conformed to execute a variety of tasks, including connecting signs, flags, chemical light sticks, and barricade rope or tape to these standard traffic cones. Provisions are also described for the direct connection of a battery operated warning lamp to a standard traffic cone.

While the above described devices and methods denote important and useful traffic control systems, they do not provide solutions to the problems associated with traffic safety control security systems addressed by the instant invention. By the very nature of traffic cones, they are necessarily placed in positions where they are frequently struck by an oncoming vehicle. Signs, flags, or lighting devices attached to the top of a cone can be thrown free of the cone under these circumstances, and actually become a dangerous projectile for passing motorists or individuals who happen to be in the immediate vicinity of the traffic cone. A similar result is often obtained when these traffic control systems are subject to high winds during extreme weather conditions. And these traffic control devices can themselves constitute a traffic hazard when they become scattered onto a roadway. In addition to vehicular accidents with traffic cones, unauthorized removal of cones and their related accessories (or outright theft of these devices) provide additional cause for concern regarding securing these systems.

It is therefore a primary object of the invention to keep intact any traffic cone accessories and the traffic cone itself all as one unit in the event of collision of the cone with a vehicle, or in the event of high winds during extreme weather conditions.

A further object of the invention is to prevent the unauthorized removal of traffic cone accessories or the traffic cones themselves from traffic safety control areas.

An additional object of the invention is to provide a traffic safety control security system capable of easy set up and knockdown by the end user of the system.

Another object is to permit the stacking of traffic cones either with or without the traffic safety control security system of the invention attached.

Still another object of the invention is to provide a simple and economical method for securely attaching warning lights, informations signs, and warning flags to standard traffic cones.

SUMMARY

These and other objects are obtained with the traffic safety control security system of the invention.

Traffic cones are available in a variety of sizes, those being approximately 28" to 36" in height have been found generally well suited for most traffic control problems. Most traffic cones are hollow with an opening at the top of the narrow portion of the cone. They are usually fabricated in rubber or an elastomeric plastic material so as to limit damage to vehicles or persons during accidental contact. As has been mentioned above, devices and methods are now readily available for connecting standard signs, standard flags with staff, and illuminating lamps to standard traffic cones. In U.S. Pat. No. 5,269,251 noted above these standard traffic control accessories are connected to standard traffic cones by means of an adapter. This adapter is made out of a relatively soft plastic, such as polyvinylchloride, being hollow so as to allow the passage therethrough of a cable or a rope, with a base portion and a top portion. The base is conformed to fit over the narrow top end of standard traffic cones, while the top portion of the adapter is made so as to conveniently accept information signs, warning flags and their staffs, and various types of area illuminating devices. In this invention when the term "Cone Adapter" is used it is referring to traffic accessory cone connectors of this type.

While traffic control systems making use of cone adapters are relatively safe in the case of impact with a moving vehicle in that the traffic cone is usually made of rubber, the cone adapter is usually made of a light weight plastic, and signs and flags can be made of light weight materials, it is still highly desirable to keep the accessories and cone together as a unit if they are involved in a collision. And, of course, securing the accessories and cone together greatly facilitates theft prevention.

It has been found that securing traffic control accessories and traffic cones together can be accomplished economically, and with significant convenience for the end user. In a first embodiment of the invention without making use of cone adapters, a steel cable connects the accessory directly to the traffic cone by means of an attachment on the accessory, and a removable security disc and lock positioned within the traffic cone. For example, a strobe light, information sign, or flag staff can have a flat plate connected at a base portion of the accessory, said plate being larger in diameter than the top surface of a traffic cone, and having a plastic or metal hook affixed at the center of the underside of the plate. An interior, removable security disc is positioned within the traffic cone, near the base or widest portion of the cone. The security disc can be fabricated in a rigid plastic material such as polyethylene, and can have a center hole large enough to permit a looped end of the cable to pass through the disc. To secure the accessory to the traffic cone, one end of the cable is passed through the opening in the hook on the bottom of the plate affixed to the accessory, the looped end of the cable being secured by a crimp sleeve. A second cable loop is formed at the other end of the cable, the looped cable end again being secured by a crimp sleeve. This second cable loop is passed through the center opening in the security disc, and a locking device, such as a padlock, is affixed to this second cable loop. In this configuration if the traffic cone is struck by a moving vehicle the accessories, such as strobe lights, informations signs, and flags, will remain together with the cone, and cannot become dangerous projectiles as was the case in the past. Further, connecting the lock secured cable loop by means of a chain to other similarly secured traffic cones in the traffic control area effectively prevents unauthorized removal or theft of the cones and accessories.

In a second embodiment of the invention the aforementioned cone adapter is employed as the means for connecting accessories including warning lights, signs, and flags. Typically the cone adapter is hollow, with a frusto-conical base portion that fits over the top of standard traffic cones, and an upstanding, circular top portion of smaller diameter, having a hollow center confluent with the hollow center of the base portion, and having suitable slots formed into the upstanding side walls of the circular shaped top portion so as to accommodate accessories such as signs, etc. The use of these multipurpose cone adapters facilitates connecting a variety of traffic control accessories quickly and with added security.

For example, a strobe light can be firmly secured to a standard cone by first adhesively securing the base of the strobe light to a special adapter as will be more fully explained. This special adapter is secured to one end of the security system cable. With the cone adapter in place on a traffic cone, the looped free end of the cable is now passed through the cone adapter and through the opening in the security disc within the traffic cone, and a lock is affixed to this looped free end of the cable. The special adapter fits into the circular top opening in the cone adapter, resulting in a firmly secured strobe light and traffic cone assembly.

In another example, an information sign can be secured with safety to a cone adapter- traffic cone assembly. An opening adjacent the middle of the sign and near the base of the sign provides the means for connecting the sign and cable together. One end of the cable is passed through the opening in the sign, this end of the cable forming a loop which is secured by a crimp sleeve. The looped free end of the cable is then passed through the cone adapter, and then passed through the opening in the security disc, and a lock is affixed to this looped free end of the cable. The sign itself is now secured within slots previously formed into the side of the circular top portion of the cone adapter, or by other suitable modifications to this top portion of the cone adapter.

In still another example of the utility and convenience of this cone adapter-traffic cone security system, a flag and staff are connected to a standard cone. A plastic or metal hook is simply connected to the base of the flag staff, the cable then connects to this hook through the cone adapter, and to the lock within the traffic cone in the same manner as described above for the information sign connection. The base of the flag staff is now secured within the circular opening in the top portion of the cone adapter.

Thus a traffic safety control security system is disclosed to substantially reduce possible injury caused by the traffic control devices becoming projectiles during collision with moving vehicles. Standard traffic cones are quickly and economically converted to supports for slightly modified standard warning lights, information signs, and flags and staffs so as to create a fully secured traffic safety control system. At the same time the security system of the invention greatly facilitates preventing theft of traffic cones and/or related traffic control accessories.

BRIEF DESCRIPTION OF THE DRAWINGS

FIG. 3 is one version of a cone adapter to facilitate the connection of various traffic safety control accessories to the top of standard traffic cones.

DETAILED DESCRIPTION

Figure 1:
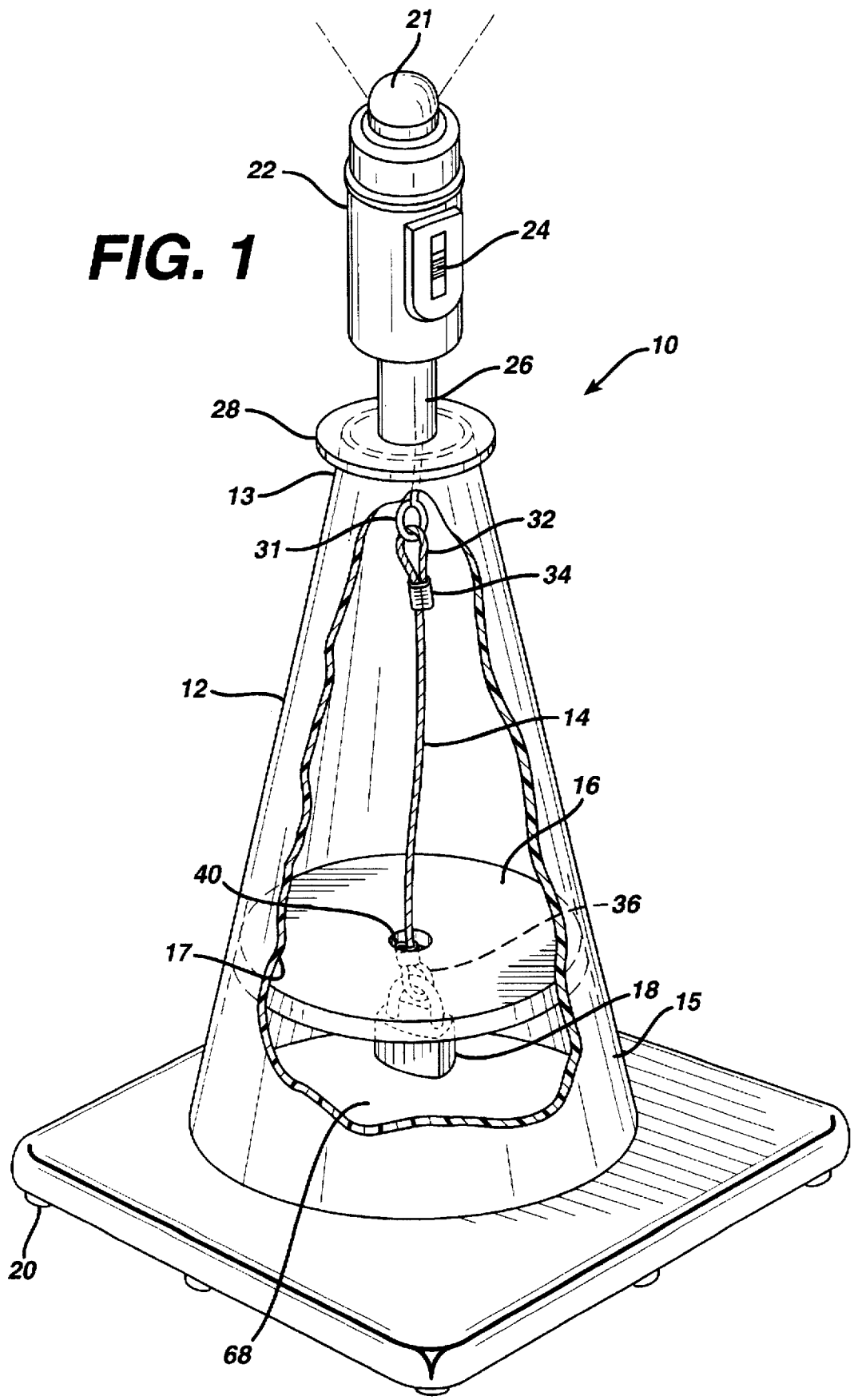
FIG. 1 is a partially sectional, perspective view of one version of the traffic safety control security system of the invention, showing a strobe light secured to a standard traffic cone.
Figure 2A:
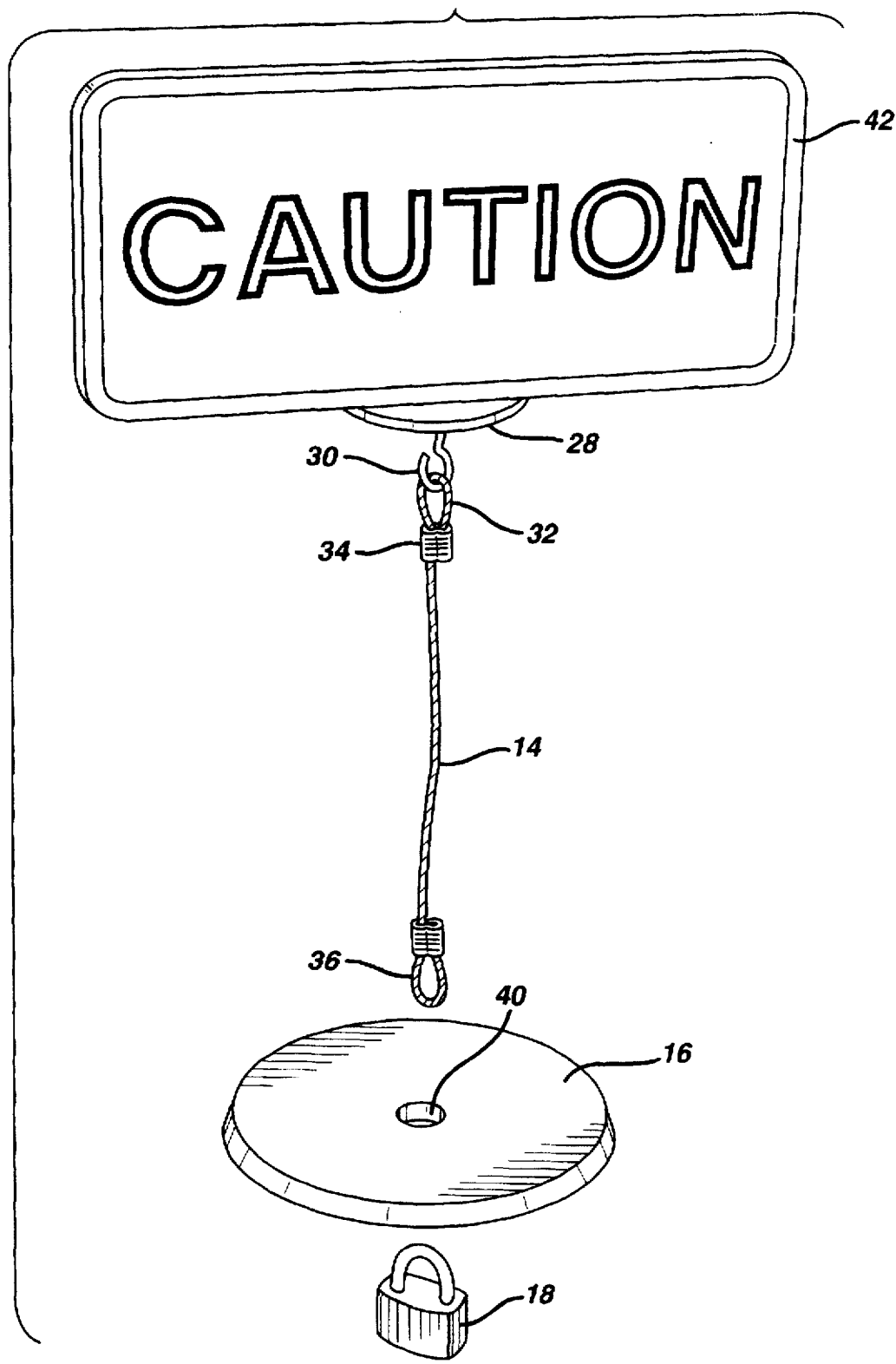
FIGS. 2A and 2B are schematic representations of one version of possible devices for securing an information sign or a warning flag to a standard traffic cone.
Figure 2B:
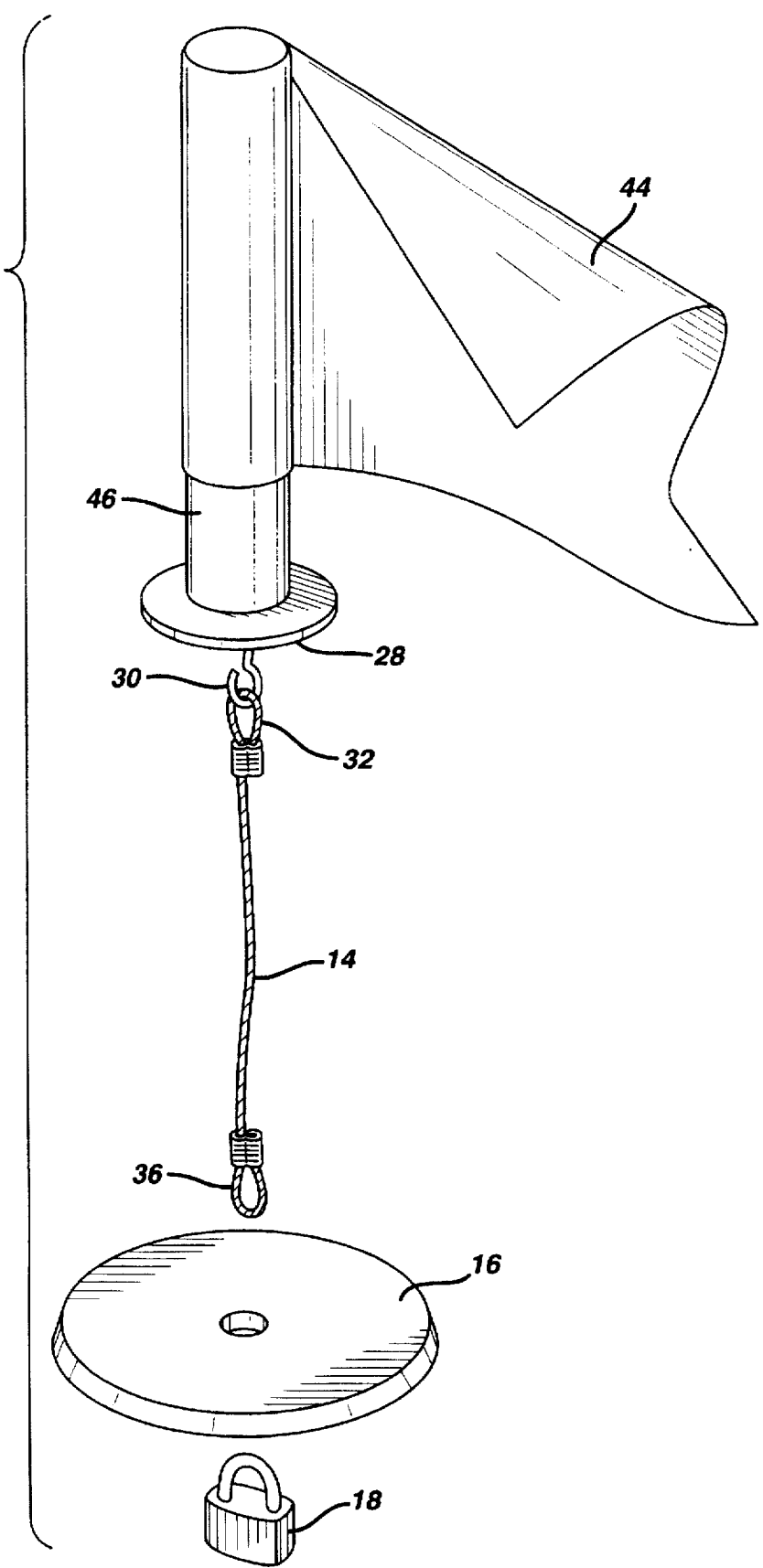

Referring now to the drawings in which similar structures having the same function are denoted by the same numerals in the various views, in FIG. 1 a first embodiment of the invention 10 illustrating a battery operated strobe light 22 as being connected and secured to a standard traffic cone 12 is depicted. The strobe light 22 has an on/off switch 24, and a top portion consisting of a light emitting bulb 21, and a base portion 26. A support base plate 28, which can be round or other convenient shapes, is affixed to the base portion 26 of the strobe light with any convenient means such as adhesively securing the base plate 28 and the base portion 26 together. On the underside of the support base plate 28 (the side facing away from the strobe light) a metal or plastic closed hook 31, i.e. an open hook 30 as depicted in FIGS. 2A and 2B being closed after assembly within a traffic cone, is attached at the approximate center of the plate. The gist of the invention follows in the description of the means for attaching traffic safety control accessories, such as a strobe light, to the tops of standard traffic cones, while at the same time securing the accessories and traffic cones together so as to prevent their flying away when struck by a vehicle or subjected to high winds. A rope, or wire, or, in a preferred embodiment of the invention, a $\frac{1}{16}$" diameter vinyl coated stainless steel aircraft cable is connected by means of a first loop 32 at one end of the cable being secured within the hook 30. This first loop is made at the end of the cable by a crimp sleeve 34 secured to the end of the cable and a portion of the cable a spaced distance below this end. A second loop 36 is made in identical fashion at the other end of the cable. To secure the strobe light 22 and traffic cone together the support base plate 28 affixed to the base portion 26 of the strobe light is placed on the top section 13 of the traffic cone, with the hook 30 on the support base plate 28 now projecting downward through the opening 66 at the top of the cone 12. With the first loop 32 of the cable secured to the hook 30, the traffic cone can be placed on its side so as to expose the large opening 68 at the base portion 15 of the traffic cone. The hook 30 is now crimped so as to form a closed hook 31. A security disc 16 (which can be a rectangularly shaped disc having rounded corners, with a hole 40 at its center, the disc normally being free floating within the traffic cone, but having a sufficient length so as to form a wedge fit with the internal wall 17 of the traffic cone if the disc is moved upwards within the cone) is now placed within the base portion 15 of the cone, the second loop 36 of the cable 14 is grasped and pushed through the hole 40 at the center of the security disc, a padlock 18 or other locking device is secured over this second loop 36. Thus a standard traffic cone and slightly modified standard strobe light are secured together in a fast, economical, and practical manner.

FIGS. 2A and 2B schematically illustrate the same method for direct connection and securing of slightly modified standard traffic control accessories to standard traffic cones as shown and described for FIG. 1. In FIG. 2A an information sign 42, such as a CAUTION sign, is shown having a support base plate 28, with hook 30, affixed to the base of the sign 42. The method for securing the sign to the traffic cone is the same cable 14, security disc 16 and padlock 18 as previously described for connecting and securing a strobe light. And, again in FIG. 2B the same support base plate 28 and hook 30 assembly is affixed to the base of a flag staff 46 with attached flag 44, the flag staff being connected and secured to the traffic cone utilizing the same cable 14, security disc 16, and padlock 18 as described above for the strobe light 22 and information sign 42.

In a second embodiment of the invention, a convenient cone adapter 48 is employed in conjunction with modified traffic safety control accessories, including warning lights, informations signs, and warning flags, and the aforementioned cable 14, security disc 16, and padlock 18. FIG. 3 illustrates one version of a typical cone adapter 48. Cone adapters are usually fabricated in a relatively soft plastic material, such as polyvinylchloride, and can be molded as a single piece, or two or more sections can be cemented or heat sealed together. The adapter 48 consists essentially of a frusto-conical, hollow base section 50, a flat shelf area 62 at the top of this base section, and a generally circular, hollow top section 52 extending a spaced distance upwards from the shelf area 62 of the adapter base portion. The base portion 50 of the adapter can have slots 64 cut into it to facilitate connecting traffic control accessories such as ropes or barricade tapes (not shown). The top section 52 of the adapter 48 can have vertical slots 54 extending from the open end of the top section to the shelf area 62 of the base of the adapter in order to facilitate the connection of an information sign to the adapter. The adapter can be provided with other vertical slots confluent with holes 56 in the sides of the adapter top section to accommodate other accessories, such as a rope (not shown). The shelf area 62 of the adapter has a center opening sufficiently large enough so as to permit the passage therethrough of objects such as the previously described hook 30. In operation the base portion of the adapter simply slip fits over the conical end 13 of a standard traffic cone, and the various traffic control accessories can then be conveniently connected directly to the top section 52 of the adapter 48.

Figure 4:
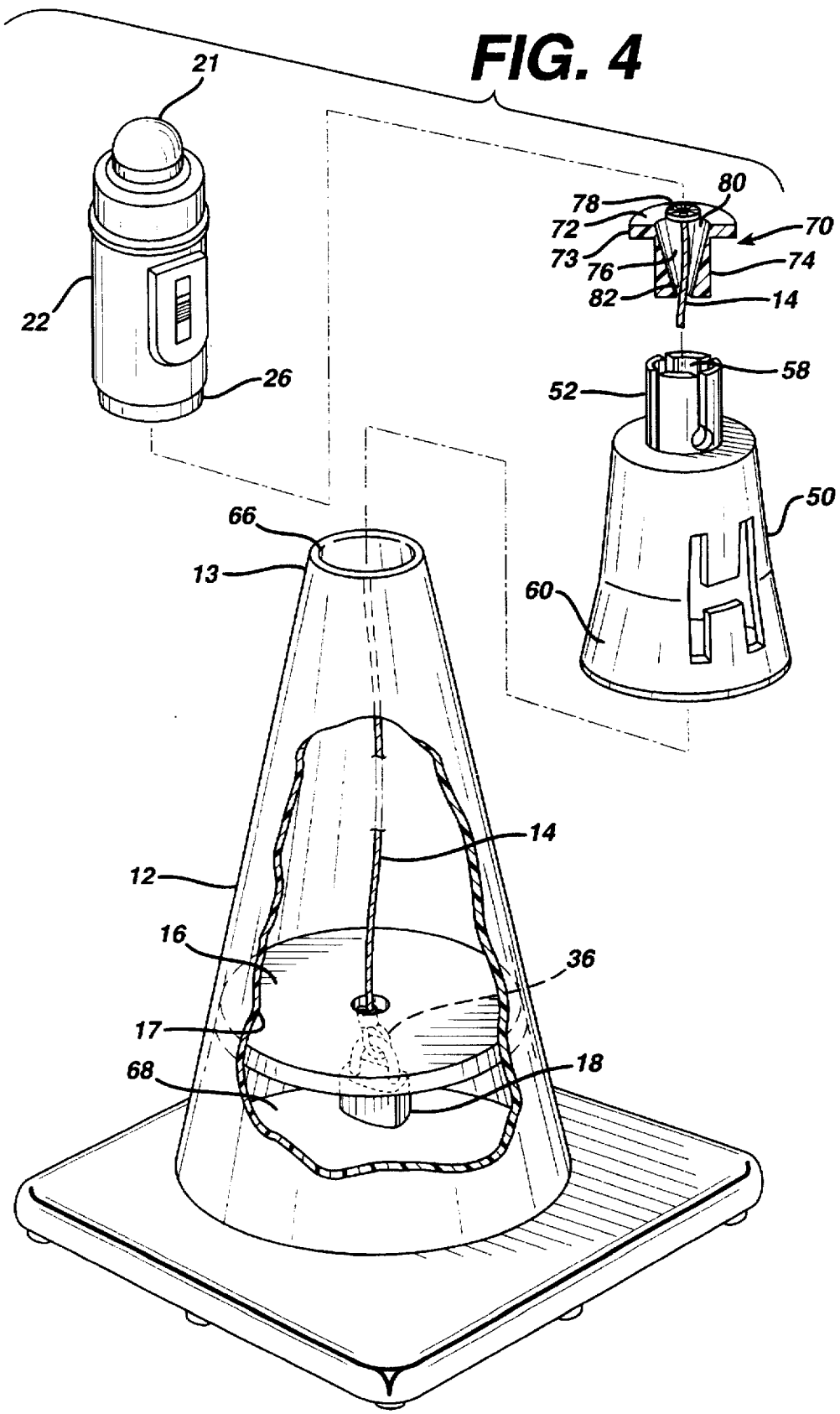
FIG. 4 is an exploded, perspective view of one version of the traffic safety control security system of the invention, showing a strobe light and cone adapter combination being secured to the top of a standard traffic cone.

In FIG. 4 an exploded view of one version of the invention making use of a cone adapter to facilitate the connection and securing of a strobe light 22 to a cone 12 is illustrated. A special adapter 70, which can be machined out of aluminum or molded in a suitable plastic material, is employed as the method for securing a strobe light 22 to a cable 14. The special adapter has a flat top surface 72 confluent with a first side wall 73, with a narrower diameter second side wall 74 extending a spaced distance below the first side wall. A hole is counterbored through the special adapter from the center of the top surface 72 to the center of the base portion of the special adapter 70. The counterbored hole 76 has a larger opening 80 adjacent the top surface of the special adapter, narrowing towards a smaller opening 82 at the base of the special adapter. This special adapter slip fits over one end of a cable 14 similar to the cable described in FIGS. 1, 2A, and 2B, except the first loop 32 previously described is replaced by a swedge coupling 78, so that this end of the cable is larger in diameter than the smaller opening 82 at the base of the special adapter 70, and therefore this special adapter cannot fall loose from the cable. The cable itself then runs through the opening 58 in the top of the cone adapter, through the cone adapter via the base opening 60 in the cone adapter, and into the traffic cone, with a second cable loop 36 as previously described in FIGS. 1, 2A, and 2B being secured with a padlock 18 beneath a security disc 16. To complete the assembly of the strobe light 22, cone adapter 48, and traffic cone 12, the base 26 of the strobe light is adhesively secured to the top surface 72 of the special adapter 70, the narrower outer side wall 74 of the special adapter then being slip fitted into the hollow center opening 58 in the top section 52 of the cone adapter.

Figure 5:
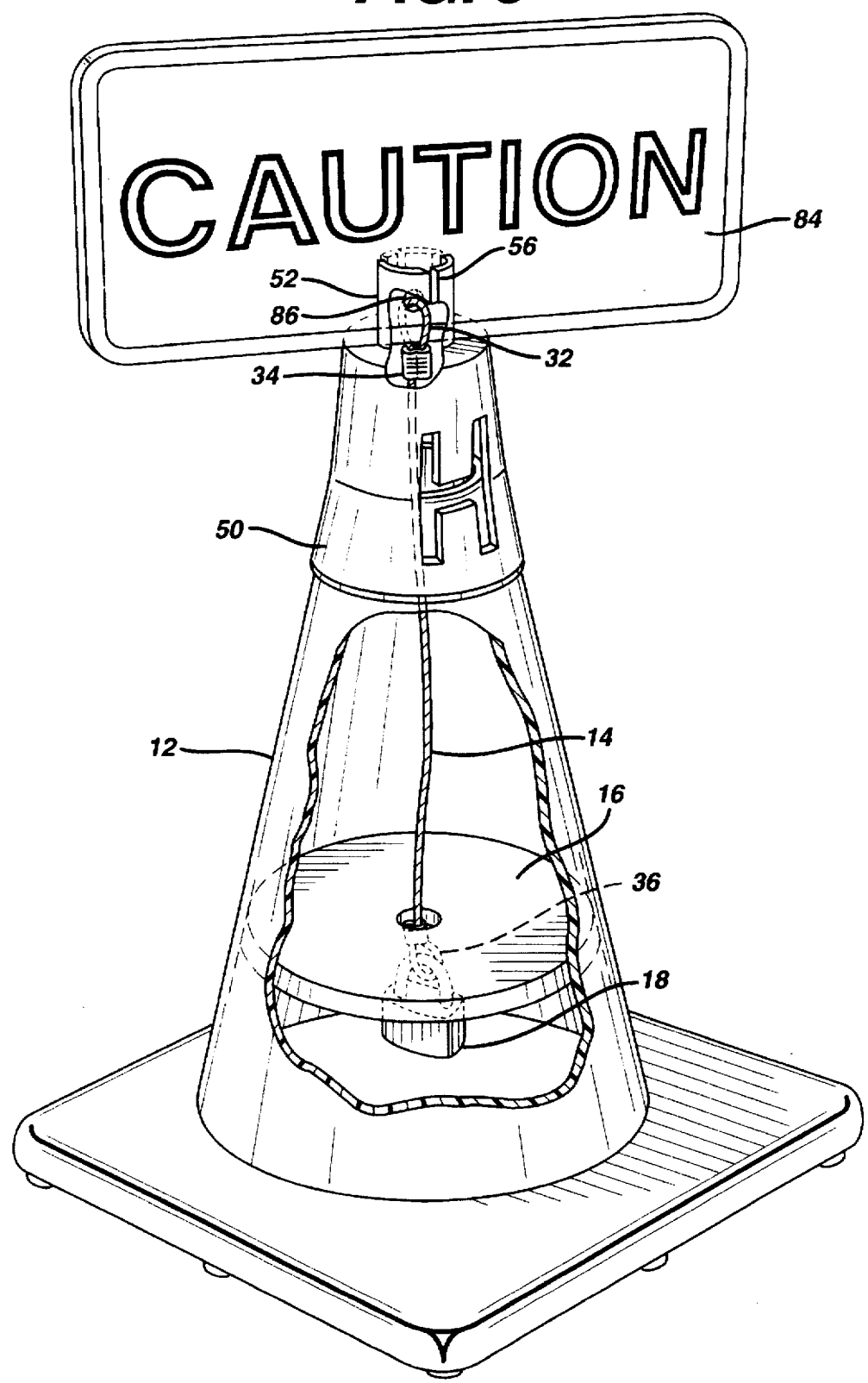
FIG. 5 is a partially sectional, perspective view of one version of the invention, showing an information sign and cone adapter combination in place on top of a standard traffic cone.
Figure 6:
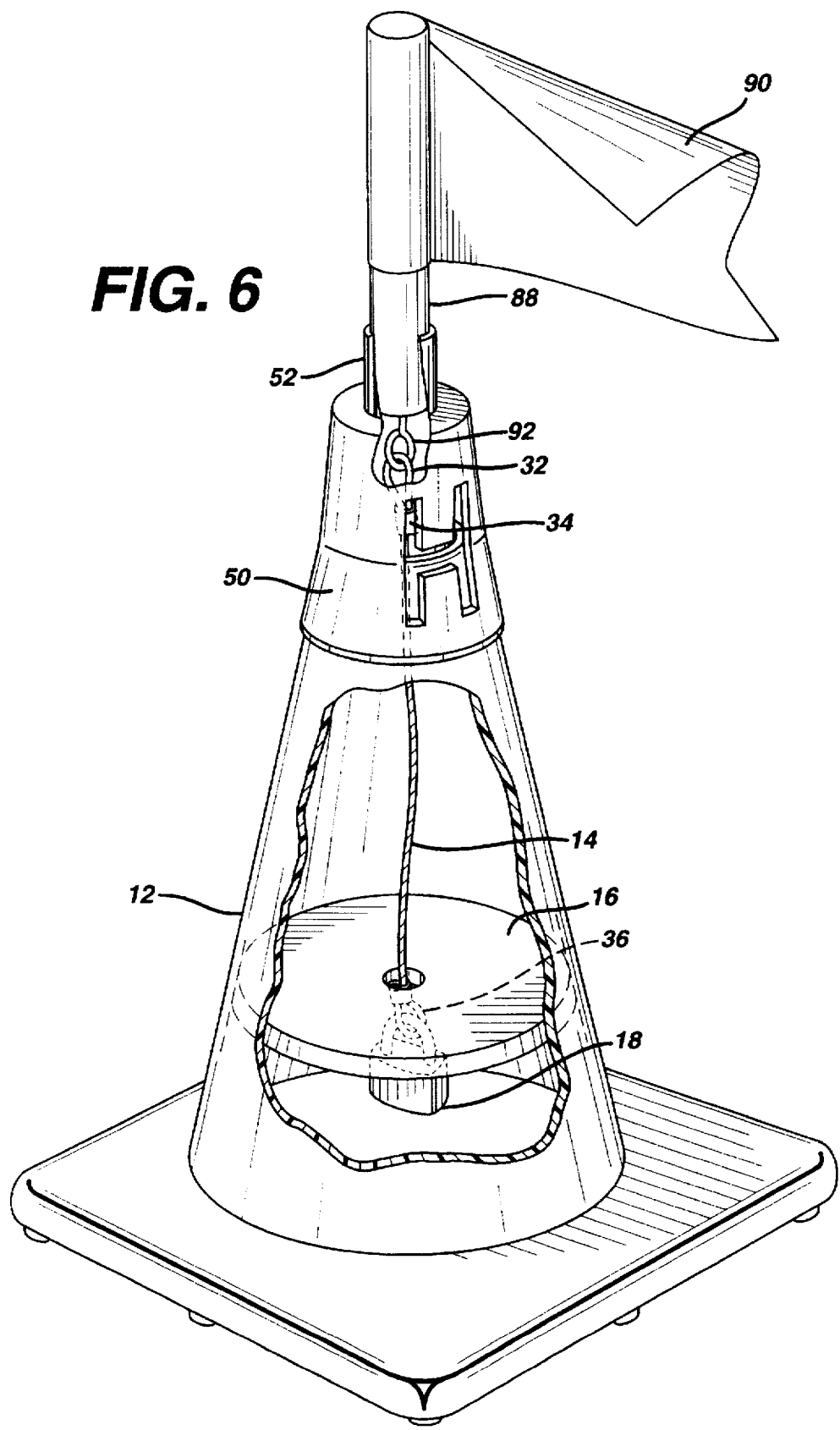
FIG. 6 is a partially sectional, perspective view of one version of the invention, showing a warning flag and flag staff and cone adapter in place on top of a standard traffic cone.

Again, the utility of a cone adapter in facilitating the connection of traffic control accessories is illustrated in FIGS. 5 and 6. In FIG. 5 an information sign 84, such as a CAUTION sign, is shown as connected by means of slots 54 in the top section 52 of a cone adapter, said cone adapter being in place atop a standard traffic cone. The connection of the sign 84, cone adapter, and traffic cone is secured by means of a cable 14 having a first loop 32 at one end of the cable passing through an opening 86 centrally located near the base of the sign, this first loop being secured by means of a crimp sleeve 34, with the cable having a second loop 36 at its other end secured by a padlock beneath a security disc, as previously described in FIGS. 1, 2A, and 2B.

In a manner similar to FIG. 5, in FIG. 6 a flag staff 88 and attached flag 90 is shown connected to a cone adapter, the cone adapter being in place atop a traffic cone. The flag connects to the cone adapter by simply having the flag staff inserted into the hollow opening 58 in the top section of the cone adapter 48. The flag staff and flag, cone adapter, and traffic cone are secured together by means of attaching a first loop 32 at one end of a cable 14 to a hook 92 (shown in closed position as, for example, hook 30 in FIGS. 2A and 2B as being shown a closed hook 31 in FIG. 1) connected at the base of the flag staff 88, with a second loop 36 at the other end of the cable being secured by a padlock 18 beneath a security disc 16, as previously described in FIGS. 1, 2A, and 2B.

Figure 7:
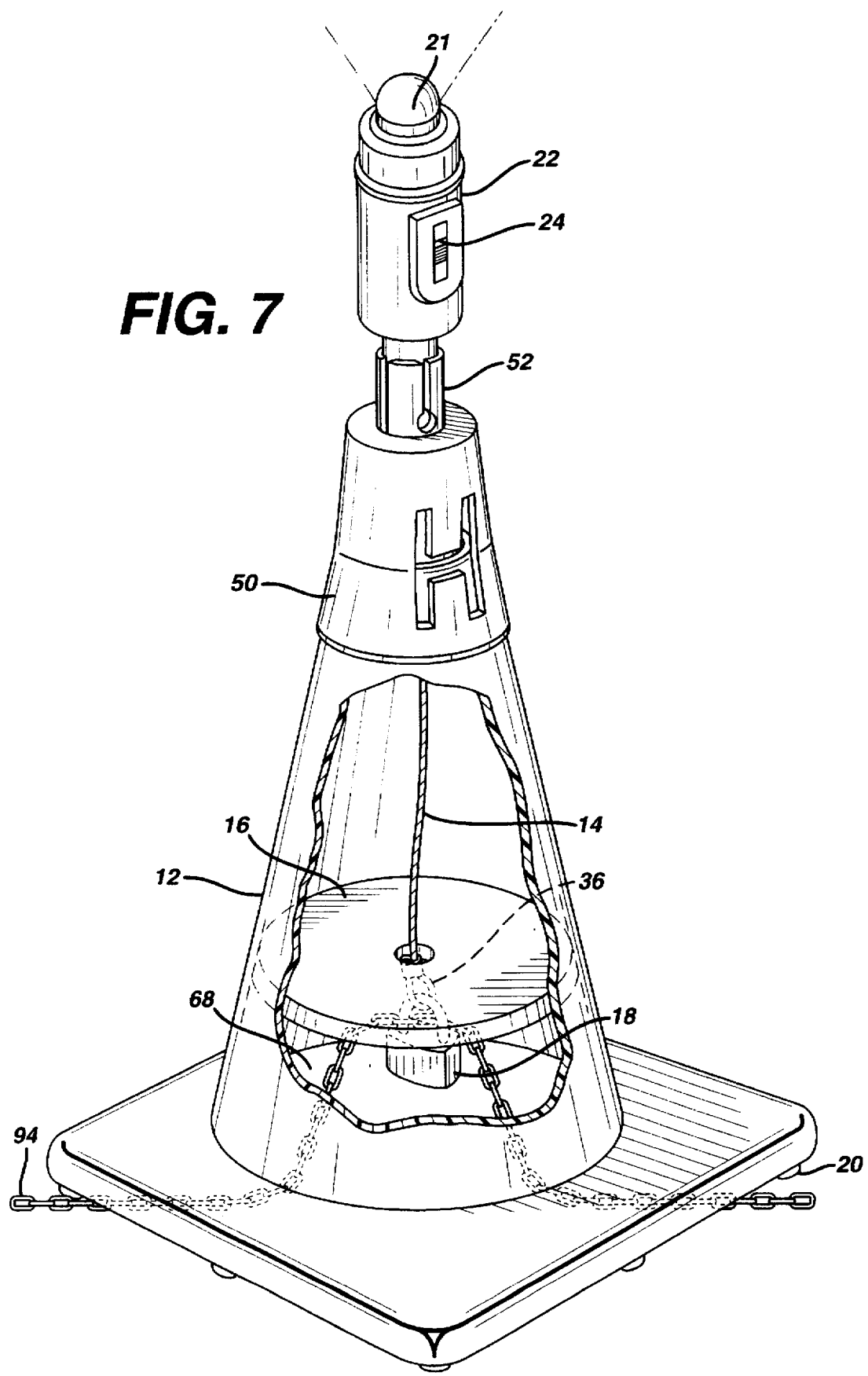
FIG. 7 is a partially sectional, perspective view of one version of the invention, showing a strobe light and cone adapter combination in place on top of a standard traffic cone, with a chain passing through a loop in the cable securing the traffic cone and strobe light together, the chain providing the means for preventing theft of the strobe light and/or traffic cone.

Another important advantage inherent in the instant invention is illustrated in FIG. 7. A strobe light 22 is shown secured to a standard traffic cone according to the invention as part of a traffic safety control system. A chain 94 is shown passing under the feet 20 of a traffic cone, into the base opening 68 in the cone, through the second loop 36 securing the cable 14 within the cone, and then continuing on for connection to other traffic cones in the system, or for connection to a non-movable object in the vicinity of the traffic control area to which the chain can be finally secured. In this manner unauthorized movement, or outright theft of the traffic cones and/or accessories is prevented.

The aforementioned crimp seals, and swedge couplings are conventional, and well known to the art. While the locking device described above for securing the cable is denoted as a padlock, other locking devices, including combination locks and electronically activated locks, can also be employed.

Thus new devices and methods are provided by the instant invention in both preventing injury from traffic safety control systems, and theft of the systems themselves. Information delivery accessories, including warning lights, signs, and warning flags are now quickly and economically installed and secured on standard traffic cones in a manner consistent with the customary placement of these traffic safety control systems.

While versions of the present invention have been shown and described in detail, various modifications and improvements thereon will become readily apparent to those skilled in the art. Accordingly, the spirit and scope of the present invention is to be limited only by the following claims.

What is claimed is:

1. A traffic safety control security system, comprising:
   (a) a traffic marker, said marker having a top and a base;
   (b) an information delivery accessory;
   (c) means for removably connecting said information delivery accessory to said top of said marker; and
   (d) means for securing said information delivery accessory and said traffic marker together so that if said marker and said accessory are caused to be rapidly moved said information delivery accessory and said marker move as a unit.

2. The traffic safety control security system according to claim 1 wherein said traffic marker is a standard traffic cone.

3. The traffic safety control security system according to claim 2 wherein said means for connecting said accessory is a substantially flat plate secured to a base portion of said accessory, said plate having means for anchoring said plate to a cable.

4. The traffic safety control security system according to claim 3 wherein said securing means comprise a cable, a security disc, and a lock, said cable having means for connecting said anchoring means on said plate to a first end of said cable, a second end of said cable being positioned beneath said security disc, said security disc being removably positioned within said cone, said security disc being normally free floating within said cone yet having a length long enough to form a wedge fit with the internal wall of said cone when said security disc is moved upwards within said cone, said security disc having an opening for the passage therethrough of said second end of said cable, said second end of said cable having means for being connected to a lock, so that when said first end of said cable is connected to said anchoring means, and said second end of said cable is connected to said lock, said information delivery accessory and said traffic cone move as a unit if said cone and said accessory are caused to be rapidly moved.

5. The traffic safety control security system according to claim 4 wherein said first and second cable end connecting means is a portion of said cable at each end of said cable being formed into the shape of a loop.

6. The traffic safety control security system according to claim 5 wherein said lock is a padlock.

7. The traffic safety control security system according to claim 4 wherein said information delivery accessory is a strobe light.

8. The traffic safety control security system according to claim 4 wherein said information delivery accessory is an information sign.

9. The traffic safety control security system according to claim 4 wherein said information delivery accessory is a flag and flag staff.

10. The traffic safety control security system according to claim 2 wherein said means for connecting said information delivery accessory to said top of said standard traffic cone is a cone adapter, said cone adapter having a base portion conformed for direct connection to the top of a traffic cone, said cone adapter having a top portion conformed to facilitate the connection of said information delivery accessories to said cone adapter.

11. The traffic safety control security system according to claim 10 wherein said information delivery accessory is a warning light.

12. The traffic safety control security system according to claim 11 wherein said warning light is a strobe light.

13. The traffic safety control security system according to claim 10 wherein said information delivery accessory is an information sign.

14. The traffic safety control security system according to claim 10 wherein said information delivery accessory is a flag and staff.

15. The traffic safety control security system according to claim 12 further comprising:
   said strobe light being secured at its base to a special adapter, said special adapter being fabricated so as to slip fit into said top portion of said cone adapter, a hole within said special adapter extending the full length of said special adapter, a cable having a first end and a second end, said first end of said cable being secured within said hole in said special adapter, said cone adapter being secured to a standard traffic cone, the second end of said cable being secured by a lock positioned beneath a security disc removably secured within said traffic cone, so that when said cone and said strobe light are caused to be rapidly moved said strobe light and said traffic cone move as a unit.

16. The traffic safety control security system according to claim 13 further comprising:
   the base of said information sign being slip fitted into slots within said top portion of said cone adapter, said securing means comprises a cable having a first end and a second end, said first end of said cable defining a first loop, said first loop being connected to a hole at the center of said base of said sign, said cone adapter being secured to a standard traffic cone, said second end of said cable defining a second loop, said second loop being secured by a lock positioned beneath a security disc removably secured within said traffic cone, so that when said cone and said sign are caused to be rapidly moved, said cone and said sign move as a unit.

17. The traffic safety control security system according to claim 14 further comprising:
   the base of said staff being slip fitted into said top portion of said cone adapter, said base of said staff having means for accepting a looped end of a cable, said securing means comprises a cable having a first end and a second end, said first end of said cable defining a first loop in said cable being connected to said accepting means at said base of said staff, said cone adapter being secured to a standard traffic cone, said second end of said cable defining a second loop in said cable, said second loop being secured by a lock positioned beneath a security disc removably secured within said traffic cone, so that when said cone and said staff are caused to be rapidly moved said cone and said staff move as a unit.

18. The traffic safety control security system according to claim 1, further comprising a chain linked to said securing means, so that unauthorized removal of said marker and said accessories is prevented.

19. A kit for securing an information delivery accessory to the top of a standard traffic cone, comprising:
   (a) means for connecting a plate to the base of said accessory;
   (b) means for connecting a looped end of a cable to said plate;
   (c) a cable having a loop at each end;
   (d) a removable security disc having a hole at its center, said disc having a sufficient length so as to create a wedge fit within said cone; and
   (e) a lock, wherein said accessory is secured to said top of said cone when said loops interconnect said accessory placed on said top of said cone to said lock positioned beneath said security disc within said cone.

20. A kit for securing an information delivery accessory to the top of a standard traffic cone, comprising:
   (a) a cone adapter for attaching said accessory to said top of said cone;
   (b) means for connecting one end of a cable to the base of said accessory;
   (c) a cable having a loop on at least one end of said cable;
   (d) a removable security disc having a hole at its center, said disc having a sufficient length so as to create a wedge fit within said cone; and
   (e) a lock, wherein said accessory attached to said cone adapter is secured to said top of said cone when said cable interconnects said accessory to said lock positioned beneath said security disc within said cone.

21. A method for securing an information delivery accessory to the top of a standard traffic cone, comprising the steps of:
   (a) placing an information delivery accessory on the top of a standard traffic cone;
   (b) connecting a first end of a cable to said accessory;
   (c) pulling a second end of said cable through a centrally located hole in a security disc, said disc being removably positioned within said cone, said disc having a length long enough to create a wedge fit within said cone; and
   (d) locking said second end of said cable on the side of said disc facing away from said accessory.

22. The method according to claim 21 further including the step of slip fitting a cone adapter over the top of said standard traffic cone prior to said step of placing said accessory on said top of said cone.

23. The method according to claim 21 further including the step of sliding a chain through said lock and thereby preventing theft of said cone and said accessory when said chain is secured to a non-movable object.

* * * * *